3,172,869
ACRYLONITRILE RESINS PLASTICIZED WITH A CYANOETHYLATED AMIDE
Robert Saxon, Stamford, Conn., assignor to American Cyanamid Company, New York, N.Y., a corporation of Maine
No Drawing. Continuation of application Ser. No. 753,125, Aug. 4, 1958. This application May 1, 1961, Ser. No. 106,971
9 Claims. (Cl. 260—32.6)

The present invention relates to improved copolymeric compositions containing an average of at least 60% by weight of combined acrylonitrile. More particularly, the present invention relates to plasticization of polymers containing at least 60% acrylonitrile in order to improve the moldability and flexural properties of these polymers for the production of useful articles of manufacture. Still more particularly, the invention is concerned with certain aqueous-insoluble bis(cyanoethyl) amides as plasticizers for said polymers.

Polyacrylonitrile has various properties which make it a highly desirable material in the field of plastics. It is highly resistant to common organic solvents; it is chemically inert; it has a high softening point; and it can be prepared easily by conventional free radical polymerization techniques. Some of the properties, however, heretofore have been considered drawbacks to broader usage of this polymer. The high softening point, which favors dimensional stability of a finished article manufactured therefrom, makes unmodified polyacrylonitrile almost impossible to mold by the usual compression or injection methods. Also, exceptionally high temperatures are required, leading to discoloration. The chemical inertness which imparts solvent resistance is believed due to strong interchain hydrogen bonding. Although desirable in many respects, this property leads to extreme rigidity, brittleness and low impact and flexural strength. Accordingly, polymers containing predominant amounts of combined acrylonitrile have been generally unsuitable for various applications, particularly in the manufacture of molded articles and as a film-forming composition due to the poor flowing properties of this polymer and because of the brittle character of the finished product. Plasticizers heretofore incorporated with polymers containing a predominance of combined acrylonitrile in order to improve the flexural properties of these polymers have not been generally satisfactory heretofore. Lack of acceptance of prior art plasticizers is due to the significant incompatibility of the plasticizing compound resulting in a gradual migration of the plasticizer to the surface with consequent brittleness and often discoloration; or because the plasticizer is substantially water-soluble and is consequently leached from the polymeric article upon contact with water, resulting in brittleness, or because they have been unsatisfactory from a practical standpoint. The present invention avoids such shortcomings and provides an improved plasticized polyacrylonitrile composition having excellent flexural properties and in which the plasticizer is water insoluble and fully compatible with the polymer.

It is an object of the present invention to provide a polymeric composition containing a preponderance of combined acrylonitrile which has improved moldability and product flexibility by incorporating into the polymer certain bis(cyanoethyl) amides as plasticizers. Other objects and advantages will become apparent hereinafter as the description of the invention proceeds.

The principal requirements for a plasticizer are: compatibility, i.e., freedom from separation or exudation when blended with the polymer; solvency, i.e., ability of the plasticizer to soften the polymer; permanence, i.e., the plasticizer must be non-volatile, chemically stable and resistant to leaching by water or other solvents under service conditions, and the plasticizer should be non-toxic and inexpensive.

The present invention is based upon the discovery that homopolymers and copolymers of acrylonitrile, specifically copolymers containing in their molecules an average of at least 60% by weight of combined acrylonitrile are compatible with certain water-insoluble bis(cyanoethyl) amides. Bis cyanoethyl compounds of this type which have been found useful include the cyanoethylated amides having the formula:

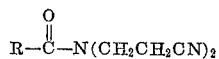

wherein R is a substituent selected from the group consisting of alkyl and aryl-substituted alkyl radicals containing 4 to 11 carbon atoms, aromatic radicals including the unsubstituted aromatic or phenyl radical, the hydroxy phenyl radical, alkyl-substituted aromatic radicals and halogen-substituted aromatic radicals containing not more than 11 carbon atoms, the

radical and the

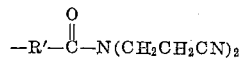

radicals wherein R′ is a $C_nH_{2n}$ group and $n$ is an integer of 2 to 11. Cyanoethyl amides having alkane chains less than 5 carbon atoms are found to have substantial water solubility which renders them unsuitable as permanent plasticizers whereas those having alkane chains greater than 11 carbon atoms are significantly incompatible with the polymer. The compounds as employed in the present invention are contemplated as permanent plasticizers which are permitted to remain in the shaped homopolymer or copolymer to provide continuing flexibility in the film or other article of manufacture.

The bis(cyanoethyl) alkanoamides employed in the present invention are believed to be new chemical compounds, suitable illustrative procedures for their preparation being described below.

PREPARATION OF N,N-BIS(2-CYANOETHYL) HEPTANOAMIDE

To 34 parts (0.23 mol) heptanoyl chloride in 107 parts of methylene chloride maintained at 0–10° C. are slowly added 60.5 parts (0.45 mol) of 3,3′-iminobispropionitrile of 91.7% purity dissolved in 165 parts additional methylene chloride. The iminobispropionitrile hydrochloride formed is removed by filtration and washed with two portions of fresh methylene dichloride. The combined filtrate and washings are extracted successively with dilute hydrochloric acid, 5% sodium bicarbonate solution and water. The oil layer is dried over calcium sulfate and distilled. After removal of solvent, a distillate is obtained boiling at 203° at 9 mm. pressure. This distillate, 50 parts, is a pale yellow viscous oil, having a refractive index $n_D^{26}=1.4749$ and a nitrogen analysis of 17.86%, as compared to the theoretical value of 18.23% calculated for

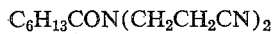

PREPARATION OF N,N,N′,N′-TETRAKIS- (2-CYANOETHYL) ADIPAMIDE 183 parts of adipyl chloride are added dropwise with stirring to 492 parts of iminobispropionitrile in 1000 parts of methylene chloride. The iminobispropionitrile hydrochloride is filtered off, the filtrate washed with an equal volume of dilute HCl, sodium bicarbonate solution and water. The solvent is removed. N,N,N',N'-tetrakis(2-cyanoethyl) adipamide,

is recrystallized from acetonitrile to give 304 parts of a white solid of M.P. 132.4°–132.8° C. analyzing 23.95% nitrogen vs. 23.58% theoretical nitrogen.

PREPARATION OF N,N-BIS(2-CYANOETHYL) BENZAMIDE

To a stirred solution of 48 parts of iminobispropionitrile in 63 parts of benzene, 28 parts of benzoyl chloride is added dropwise, the reaction temperature being maintained below 40° C. by means of external cooling. An additional 45 parts of benzene, 550 parts of chloroform and 200 parts of 5% aqueous sodium bicarbonate solution are now added. The organic (lower) layer is washed with more water and then concentrated by distillation to about ⅓ volume. The solution on cooling deposited white crystals of N,N-bis(2-cyanoethyl) benzamide, M.P. 111–112.5° C.; yield 28 parts. An additional 11 parts of product is obtained by further evaporation of the mother liquors from the first crop. The total yield corresponded to 83% of the theoretical.

The preparation of other cyanoethyl alkanoamides may be accomplished via the reaction of the corresponding acyl halides and iminobispropionitrile. Suitable alkanoamides within the contemplation of the invention in addition to N,N-bis(2-cyanoethyl) heptanoamide include N,N-bis-(1-cyanoethyl) heptanoamide, N,N-bis(1-cyanoethyl) pentanoamide, N,N-bis(2-cyanoethyl) pentanoamide, N,N-bis(1-cyanoethyl) hexanoamide, N,N-bis(2-cyanoethyl) hexanoamide, N,N-bis(1-cyanoethyl) octanoamide, N,N-bis(2-cyanoethyl) octanoamide, N,N-bis(1-cyanoethyl) decanoamide, N,N-bis(2-cyanoethyl) decanoamide, and the like.

Bis(cyanoethyl) amides of aromatic acids and arylaliphatic acids are also contemplated as useful plasticizers for polymers predominantly in acrylonitrile. Such amides may, if desired, contain no substituents on the aromatic ring other than that which includes the amide function, for example, N,N-bis(cyanoethyl) benzamide, N,N-bis-(1-cyanoethyl) benzamide, N,N-bis(2-cyanoethyl) phenylacetamide, and N,N-bis(2-cyanoethyl)-2-phenylpropionamide. If desired, however, such amides may be substituted on the aromatic ring by alkyl, or by halogen. Examples of amides containing alkyl-substituted aromatic rings within the spirit of this invention include N,N-bis-(2-cyanoethyl) -o-, -m-, and -p-toluamides and N,N-bis-(2-cyanoethyl)-o-, -m-, and -p-methylphenylacetamides. Examples of amides halogen substituted on the aromatic ring include N,N-bis(2-cyanoethyl)-o-, -m-, and -p-chlorobenzamides, N,N-bis(2-cyanoethyl)-o-, -m-, and -p-bromobenzamides and N,N-bis(2-cyanoethyl)-o-, -m-, and -p-chlorophenylacetamides. In addition, tetrakis(cyanoethyl) amides of dibasic acids are also contemplated; such compounds include, in addition to N,N,N',N'-tetrakis(2-cyanoethyl) adipamide as described above, N,N,N',N'-tetrakis(1-cyanoethyl) adipamide, N,N,N',N'-tetrakis(2-cyanoethyl) sebacamide, N,N,N',N'-tetrakis(2-cyanoethyl) phthalamide, and the like.

Homopolymeric acrylonitrile and acrylonitrile copolymers containing in the polymer molecules an average of at least 60% by weight of combined acrylonitrile are employed in carrying the present invention into effect. In a preferred embodiment, the invention contemplates copolymers of acrylonitrile containing from 60% to about 90% acrylonitrile and from 40% to about 10% of a different copolymerizable monomer having a $CH_2=C<$ group. These polymers and copolymers are prepared by methods now well known to those skilled in the art. In some cases, the polymerization rates of the individual monomers in a polymerizable mixture may be different, with the result that the proportions of the components in the final copolymer are different from the proportions thereof in the mixture of monomers which is polymerized. The proportions of monomers in the polymerizable mixture therefore preferably are adjusted, in practicing the present invention, so that the final copolymer contains in the molecules thereof an average of at least 60% by weight of combined acrylonitrile. The expression "polymerization product containing in the polymer molecules an average of at least 60% by weight of combined acrylonitrile," as used herein, means a polymerization product (polymer, copolymer or interpolymer or mixture thereof) containing in its molecules an average of at least 60% by weight of the acrylonitrile unit

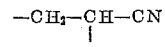

or, otherwise stated, at least 60% by weight of the reactant substance converted into and forming the polymerization product is acrylonitrile.

Illustrative examples of monomers which may be copolymerized with acrylonitrile to yield a polymerization product (copolymer or interpolymer) containing in the polymer molecule an average of at least 60% by weight of combined acrylonitrile are compounds containing a single $CH_2=C<$ grouping, for instance, the vinyl esters and especially the vinyl esters of saturated aliphatic monocarboxylic acids, e.g., vinyl acetate, vinyl propionate, vinyl butyrate, etc.; vinyl and vinylidene halides, e.g. the vinyl and vinylidene chlorides, bromides and fluorides; acrylic and alkacrylic acids, e.g. methacrylic, ethacrylic, etc., and esters and amides of such acids, e.g. methyl, ethyl, propyl, butyl, etc., acrylates and methacrylates, acrylamide, methacrylamide, N-methyl, -ethyl, -propyl, -butyl, etc. acrylamides and methacrylamides, etc.; methacrylonitrile, ethacrylonitrile and other hydrocarbon-substituted acrylonitriles; vinyl aromatic monomers, e.g. styrene, the methyl styrenes, e.g. ortho-, meta- and para-methyl styrene, dimethyl styrene, as well as halogenated styrenes, such as chloro- and bromo-styrenes, methyl styrenes and the like; unsaturated aliphatic hydrocarbons containing a single $CH_2=C<$ grouping, e.g. isobutylene, etc.; and numerous other vinyl, acrylic and other compounds containing a single $CH_2=C<$ grouping which are copolymerizable with acrylonitrile to yield thermoplastic copolymers.

The proportions of monomers in the polymerizable mixture may be varied as desired or as may be required in order to obtain a polymerization product containing in the polymer molecules an average of at least 60% by weight of combined acrylonitrile. Thus, when the polymerization rate of the monomers present in the polymerizable mixture is substantially the same, the proportions may be for example, from, by weight, about 60% to about 100% of acrylonitrile and up to about 40% of the other comonomer. When the polymerizable mixture contains, combined with the acrylonitrile, a monomer such, for example, as vinyl chloride, vinyl acetate, isobutylene, etc., which polymerizes at a rate different from that of acrylonitrile, then it may be necessary to subject to polymerization conditions a mixture in which the acrylonitrile constitutes as little as 50% by weight thereof in order to obtain a polymerization product containing in the copolymer molecules an average of at least 60% by weight of acrylonitrile. For example, in the copolymerization of acrylonitrile and isobutylene, a monomer charge in the ratio of acrylonitrile to isobutylene of about 50:50 is generally required to obtain a copolymer having a combined ratio of 70:30, respectively.

Any suitable method of polymerizing the monomeric acrylonitrile or mixture of monomers may be employed. One suitable method comprises polymerizing the monomer or mixture of monomers in an aqueous emulsion using a suitable polyerization catalyst such as ammonium persulfate, for example. Other polymerization methods, however, also may be used such as those described in Bauer et al. U.S. Patents Nos. 2,160,054, and 2,436,926, for example. The polymeric and copolymeric acrylonitriles used in practicing the instant invention may be of any suitable molecular weight, but ordinarily the molecular weight (average molecular weight) is within the range of about 40,000 to about 1,000,000 or higher, and advantageously is of the order of about 50,000 to about 750,000 as calculated from a viscosity measurement of the polymer in dimethyl formamide using the well-known Staudinger equation which is referred to in U.S. Patent No. 2,404,713.

Incorporation of the plasticizers in the acrylonitrile polymer may be conducted by any suitable procedure, either by blending on a two-roll mill or by use of a Banbury mixer, for example. The blending time may be shortened by using a comminuted polymer as starting material for the blend. To minimize the possibility of discoloration, it is generally advisable to employ blending temperatures as low as is consistent with practical considerations, although temperatures up to 170° C. and even higher may be employed with certain polymers and mixing cycles. The proportions of the acrylonitrile polymerization product and the cyanoethyl plasticizer in the composition of the present invention may be varied widely, depending mainly on the properties desired in the particular use for which the composition is intended. In the preparation of a film, for example, amounts of as little as 5%, based on the weight of the polymer, may be sufficient. On the other hand, amounts of 100% and even greater quantities of the plasticizer based on the weight of the polymer may be usefully employed, particularly in heavy sheeting or molded objects.

The plasticized compositions of the present invention may be molded into useful articles of manufacture by procedures well known by those with ordinary skill in the art. Also, as noted hereinabove, the plasticized acrylonitrile polymerization product may be cast in the form of films. For example, a dimethyl formamide solution of the acrylonitrile polymer may be cast upon a revolving drum which is partly immersed in a coagulating bath of, for example, water, cold benzene, etc. which will extract the dimethyl formamide and serve to deposit the acrylonitrile polymerization product as a thin film on the drum as it passes through the bath. The resulting film may be stretched, if desired, lengthwise and crosswise by suitable apparatus to improve its properties. Alternatively, solutions of the acrylonitrile polymer and cyanoethyl amide plasticizer may be evaporated in dimethyl formamide in a gaseous atmosphere to form films which may be similarly stretched to improve their properties.

Compositions comprising the cyanoethyl amide compounds hereinbefore described with polymer comprising at least 60% combined acrylonitrile may also be employed as a dielectric or in the manufacture of components for electrical applications. The plasticized composition can also be combined with paper, fabrics and other dielectrics.

In order that those skilled in the art may better understand how the invention may be practiced, the following examples are given by way of illustration and are not to be construed as a limitation of the invention. In the examples, all parts are by weight unless noted otherwise.

*Example 1*

One part of the N,N-bis(cyanoethyl) heptanoamide prepared as above and 2 parts of a copolymer of 73% acrylonitrile and 27% isobutylene by weight were combined in a suitable vessel. This mixture was worked on heated rolls for 15 minutes to yield a soft, flexible mass which was readily stripped from the rolls. It was pressed between heated platens separated by 0.078" shims. The resulting sheet was smooth, flexible and free from cracks. When tested according to ASTM test D–638, the sample showed a tensile strength of 1800 lbs./sq. inch and an ultimate elongation of 360%. A control in which only the copolymer without plasticizer was used produced a stiff sheet so inflexible that it could not be subjected to the standard elongation test.

*Example 2*

Eight parts of a copolymer of 90/10 acrylonitrile/ethyl acrylate were dissolved in 100 parts of dimethyl formamide. Four parts of N,N-bis(2-cyanoethyl) heptanoamide are added to plasticize the copolymer and a film is drawn. After drying for 6 hours at 65° C. the film has a thickness of about 0.002–0.003 inch and is quite pliable. A similar film made without admixture of N,N-bis(2-cyanoethyl) heptanoamide is very stiff. The stiff unplasticized film has an elongation of 8%, while the plasticized film has an elongation of 46%.

*Example 3*

The experiment of Example 2 was repeated, except that a copolymer of 70/30 acrylonitrile/vinylidene chloride is used instead of the acrylonitrile/ethyl acrylate copolymer of the previous example. The plasticized film containing N,N-bis(2-cyanoethyl) heptanoamide has an elongation of 130% while the unplasticized film made as a control has an elongation of 15%.

*Example 4*

Two parts of a copolymer comprising 78 parts acrylonitrile and 22 parts isobutylene, and 1 part of N,N-bis-(cyanoethyl) heptanoamide, are dissolved in 30 parts of dimethyl formamide, and a film cast from the resulting clear solution. A control film from which the plasticizer is omitted is also cast. The films are examined after air drying overnight. The control film is stiff, while the plasticized film is soft and flexible.

*Example 5*

Two parts of the resin and 1 part of the plasticizer of Example 4 are blended by stirring with 4 parts of methanol to form a slurry. Thereafter the methanol is evaporated on a steam bath. The resulting granular material is compression molded to form a bar. This bar was so flexible that it could not be made to break in a notched impact strength test (thus having an impact strength considerably in excess of 2 ft.-lb./inch), while a bar similarly made but withohut plasticizer was hard and stiff, with an impact strength of only 0.6 ft.-lb./inch.

*Example 6*

Two parts of a copolymer comprising 80 parts acrylonitrile and 20 parts butyl acrylate are dissolved in 20 parts of dimethyl formamide together with 1 part of N,N-bis(2-cyanoethyl) benzamide, and a film is cast from the resulting clear solution. Another film, from which the N,N-bis(2-cyanoethyl) benzamide was omitted, is also cast. After drying overnight in an oven at 80°, the films are each 0.0026 inch thick. The plasticized film is very soft and has an ultimate elongation of 265%, while the control film was stiff and had an ultimate elongation of only 9%.

*Example 7*

Two parts of a copolymer of acrylonitrile and butyl acrylate in the proportion 80/20 by weight and 1 part of N,N,N',N'-tetrakis(2-cyanoethyl) adipamide are dissolved in 20 parts of dimethyl formamide. A film is cast from the resulting solution which, after evaporation of the solvent, is 0.003 inch thick. The film obtained is clear, tough and flexible. It could be extended about 100% before rupture, while a similar film from which the substituted adipamide had been omitted could be stretched only 9% before rupture.

From the foregoing description, it will be seen that the present invention provides compositions comprising an acrylonitrile polymerization product and a plasticizer. These compositions can be shaped or fabricated, as by extrusion, molding, casting, etc. into a wide variety of useful articles. Lubricants, antistatic agents and other conventional modifiers of acrylonitrile polymerization products can be incorporated therein at any suitable stage of the operation.

This invention is a continuation of a copending application for Letters Patent, Serial No. 753,125, filed August 4, 1958, now abandoned.

I claim:
1. A synthetic resinous composition comprising (1) a polymer selected from the group consisting of homopolymers of acrylonitrile and copolymers of acrylonitrile and a monoethylenically unsaturated monomer copolymerizable therewith, said copolymers containing at least 60% by weight of combined acrylonitrile and (2) a plasticizing amount of a cyanoethylated amide having the formula:

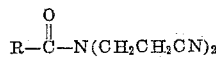

wherein R is a substituent selected from the group consisting of (a) alkyl radicals having from 4 to 11 carbon atoms, (b) an unsubstituted monoaryl substituted alkyl radical, said alkyl radical having 1 to 3 carbon atoms, (c) a halogen substituted monoaryl substituted alkyl radical wherein said halogen substituent is selected from the group consisting of chloro and bromo and said alkyl radical contains 1 to 2 carbon atoms, (d) a methyl substituted monaryl substituted alkyl radical wherein said alkyl radical contains 1 to 2 carbon atoms, (e) the

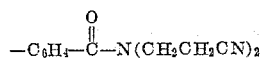

radical and (f)

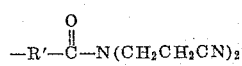

radicals where R' is a $C_nH_{2n}$ radical wherein $n$ is an integer of 2 to 11.

2. A synthetic resinous composition comprising (1) a copolymer containing from 60 to about 90 weight percent combined acrylonitrile and from 40 to about 10 weight percent of a monoethylenically unsaturated monomer copolymerizable therewith and (2) a plasticizing amount of a cyanoethylated amide having the formula:

wherein R is a substituent of the group consisting of (a) alkyl radicals having from 4 to 11 carbon atoms, (b) an unsubstituted monoaryl substituted alkyl radical, said alkyl radical having 1 to 3 carbon atoms, (c) a halogen substituted monoaryl substituted alkyl radical wherein said halogen substituent is selected from the group consisting of chloro and bromo and said alkyl radical contains 1 to 2 carbon atoms, (d) a methyl substituted monoaryl substituted alkyl radical wherein said alkyl radical contains 1 to 2 carbon atoms, (e) the

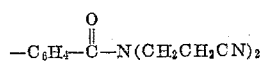

radical and (f)

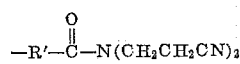

radicals wherein R' is a $C_nH_{2n}$ radical wherein $n$ is an integer of 2 to 11.

3. A synthetic resinous composition comprising (1) of copolymer containing from 60 to about 90 weight percent combined acrylonitrile and from 40 to about 10 weight percent of butyl acrylate and (2) a plasticizing amount of a cyanoethylated amide having the formula:

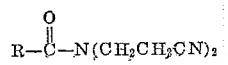

wherein R is a substituent selected from the group consisting of (a) alkyl radicals having from 4 to 11 carbon atoms, (b) an unsubstituted monoaryl substituted alkyl radical, said alkyl radical having from 1 to 3 carbon atoms, (c) a halogen substituted monoaryl substituted alkyl radical wherein said halogen substituent is selected from the group consisting of chloro and bromo and said alkyl radical contains 1 to 2 carbon atoms, (d) a methyl substituted monoaryl substituted alkyl radical wherein said alkyl radical contains 1 to 2 carbon atoms, (e) the

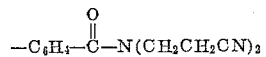

and (f)

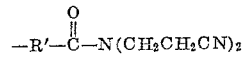

wherein R' is a $C_nH_{2n}$ radical wherein $n$ is an integer of 2 to 11.

4. A synthetic resinous composition comprising (1) a copolymer containing from 60 to about 90 weight percent combined acrylonitrile and from 40 to about 10 weight percent of a monoethylenically unsaturated monomer copolymerizable therewith and (2) a plasticizing amount of N,N-bis(2-cyanoethyl) heptanoamide.

5. A synthetic resinous composition comprising (1) a copolymer containing from about 60 to about 90 weight percent combined acrylonitrile and from about 40 to about 10 weight percent isobutylene and (2) a plasticizing amount of N,N-bis(2-cyanoethyl) heptanoamide.

6. A synthetic resinous composition comprising (1) a copolymer containing from about 60 to about 90 weight percent combined acrylonitrile and from about 40 to about 10 weight percent ethyl acrylate and (2) a plasticizing amount of N,N-bis(2-cyanoethyl) heptanoamide.

7. A synthetic resinous composition comprising (1) a copolymer containing from about 60 to about 90 weight percent combined acrylonitrile and from about 40 to about 10 weight percent vinylidene chloride and (2) a plasticizing amount of N,N - bis(2 - cyanoethyl) heptanoamide.

8. A synthetic resinous composition comprising (1) a copolymer containing from 60 to about 90 weight percent combined acrylonitrile and from 40 to about 10 weight percent of a monoethylenically unsaturated monomer copolymerizable therewith and (2) a plasticizing amount of N,N-bis(2-cyanoethyl) benzamide.

9. A synthetic resinous composition comprising (1) a copolymer containing from 60 to about 90 weight percent combined acrylonitrile and from 40 to about 10 weight percent of a monoethylenically unsaturated monomer copolymerizable therewith and (2) a plasticizing amount of N,N,N',N'-tetrakis(2-cyanoethyl) adipamide.

References Cited by the Examiner
UNITED STATES PATENTS

| | | | |
|---|---|---|---|
| 2,404,716 | 7/46 | Hansley | 260—32.6 |
| 2,404,723 | 7/46 | Merner | 260—32.6 |
| 2,619,498 | 11/52 | Ladd | 260—465.4 |
| 2,623,895 | 12/52 | Steinbrunn | 260—465.4 |
| 2,798,059 | 7/57 | Guth et al. | 260—32.6 |
| 2,927,126 | 3/60 | Pursglove | 260—465.4 |
| 2,938,008 | 5/60 | Hare | 260—32.6 |
| 2,982,753 | 5/61 | Holmes | 260—32.6 |

ALEXANDER H. BRODMERKEL, Primary Examiner.

LEON J. BERCOVITZ, WILLIAM H. SHORT, MORRIS LIEBMAN, Examiners.